United States Patent

[11] 3,631,529

| [72] | Inventor | Sadakimi Ohyama<br>Tokyo, Japan |
|---|---|---|
| [21] | Appl. No. | 858,014 |
| [22] | Filed | Sept. 15, 1969 |
| [45] | Patented | Dec. 28, 1971 |
| [73] | Assignee | Shiba Electric Co., Ltd.<br>Tokyo, Japan |
| [32] | Priority | Feb. 17, 1969 |
| [33] | | Japan |
| [31] | | 44/11061 |

[54] APPARATUS FOR ELIMINATING SPARK NOISE GENERATED FROM A DIRECT CURRENT MOTOR
3 Claims, 7 Drawing Figs.

[52] U.S. Cl. .................................................... 318/138,
318/439
[51] Int. Cl. ........................................................ H02k 13/14
[50] Field of Search ........................................... 318/138,
439; 307/136

[56] References Cited
UNITED STATES PATENTS

| 3,237,030 | 2/1966 | Coburn ........................ | 307/136 |
| 3,437,898 | 4/1969 | Bates ........................... | 318/138 |
| 3,453,513 | 7/1969 | Bates et al. .................. | 318/138 |
| 3,532,949 | 10/1970 | Williams et al. ............. | 318/138 |

Primary Examiner—Bernard A. Gilheany
Assistant Examiner—W. E. Duncanson, Jr.
Attorney—Webb, Burden, Robinson & Webb ABSTRACT: An apparatus for eliminating the sparking noise originating from the commutator in a DC motor in a communication device having a DC motor and a high gain amplifier. The apparatus has at least one commutator position indicator providing a signal corresponding to each sparking period. A circuit converts the signal into an appropriate gate pulse signal which actuates a gating circuit switching off the current to the DC motor during the sparking period.

PATENTED DEC 28 1971  3,631,529

INVENTOR
SADAKIMI OHYAMA

BY Webb, Burden, Robinson & Webb
ATTORNEYS

APPARATUS FOR ELIMINATING SPARK NOISE GENERATED FROM A DIRECT CURRENT MOTOR

In a communication device such as a magnetic video tape recorder employing a high gain amplifier, the spark noise originating from the commutator of the tape driving DC motor is detrimental to the functioning of the device. In the conventional magnetic tape recorder which records or reproduces a video signal distributed over a wide frequency range, an alternating current motor has been generally used as a power source since sparking in the DC motor interferes with the reproduction of faint signals on the magnetic tape as a pulsating noise. According to this invention, the noise is eliminated by gating the source current of the motor for the commutation period. In other words, an apparatus eliminates the spark noise that occurs when the commutation process is imperfect by switching off a source current for the spark period.

When the spark noise can be eliminated, a DC motor has various advantages in comparison with an alternating current motor. These advantages include:
1. higher and greater starting torque can be obtained,
2. the machine can be more easily miniaturized,
3. a DC motor is suitable for portable devices because a battery can be used as a power source.

The sparking occurs when the commutation process is imperfect, that is, when a brush starts to contact with or to leave a commutator segment. Furthermore, sparking causes erosion of both the brush and the commutator segment and the consequent roughening of both the brush and the commutator surface increases sparking. In an apparatus including a high gain amplifier such as a magnetic tape recorder, such sparking is undesirable especially when reproducing a very faint signal from a magnetic tape because it includes a high-frequency component and because the sparking of the high frequency causes radiation and electrostatic or electromagnetic induction to the head portion or to other outgoing lines through which the reproduced signal passes.

In order to avoid the said problems, the "noncommutation type DC motor," for example, a thyristor motor has been developed. In a thyristor motor a rotating position detector is provided in place of a brush and a circuit consisting of plural thyristors is provided substituting for a commutator of the commutation type motor. Rotating torque is supplied by switching the order of continuity of the said thyristors according to a control signal from the said detector.

However, such a motor has the following defects:
1. It is very difficult to obtain sufficient torque at starting or at low speed rotating and, accordingly, it takes a considerable period of time for the motor to operate at a determined constant speed.
2. It is very difficult to miniaturize the machine since it inevitably accompanies such switching circuit.
3. The motor needs a considerable amount of current capacity because rotating efficiency is less than that of the commutation type motor.

Because of these problems, such noncommutation type motors have never been employed as a power source in a device such as a portable magnetic tape recorder.

An object of this invention is to provide a novel apparatus for preventing occurrence of the sparking that is considered to be the only defect when the commutation type DC motor is utilized as a power source in a device including a high gain amplifier. In this invention, the problem is overcome by switching off the source current for a short period during which the sparking occurs between a brush and a commutator using a control signal obtained from a commutator position detector responsive to detect a magnetic, electrostatic, optical and/or other position indicating signal.

The occurrence of such sparking has intimate correlation with the respective width of the brush and the commutator, as well as the number of the commutators. Namely, when the width of the brush and the width of the commutator are substantially equal to each other, the respective sparkings at both ends of the brush occur simultaneously. On the other hand, when the width of the brush and the width of the commutator differ with each other, the respective sparkings at both ends of the brush do not necessarily occur at the same time. In this case, it is necessary to form two commutator position indicating signals to correspond to the respective sparkings that occur at both ends of the brush.

Other objects and advantages of this invention will be understood from a consideration of the following detailed description made with reference to the accompanying drawing, in which.

Figure 2:
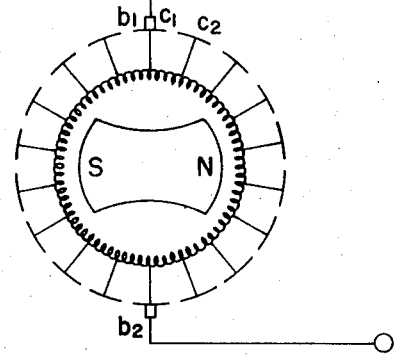
FIG. 2 is a schematic view of the principal part of the commutation type DC motor for explaining the occurrence of the sparking.

FIGS. 3A–E shows typical wave forms of voltages and currents of various parts of the circuit shown in FIG. 2.

Figure 1:
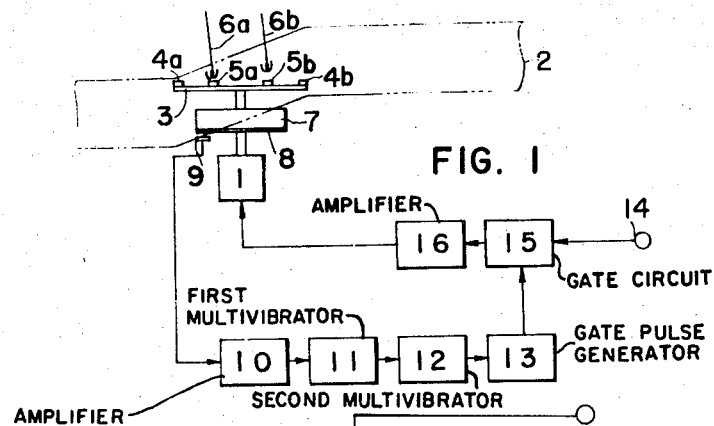
FIG. 1 is an electrical schematic diagram of a spark noise eliminating circuit of this invention which is embodied in a magnetic tape recorder.

Referring to the drawing in particular to FIG. 1 and FIG. 2, the DC motor in this embodiment serves for driving rotary heads. Brushes $b_1$ and $b_2$ are provided to contact with the commutators and symmetrically arranged around a rotating axis. Eighteen commutator segments $C_1$ $C_2$ are uniformly spaced on the surface of a rotor. Accordingly, it is not necessary to make separate control signals corresponding to each sparking that occurs at $b_1$ and $b_2$ because the sparkings are coincided with each other.

On the other hand, at both ends of the brush $b_1$ or the brush $b_2$, sparkings occur separately since the width of the brush is narrower than that of the commutator segments as shown in FIG. 2. As a result, separate circuits for position indicating signals corresponding to each sparkings are required. However, in order to simplify the explanation, only one of the said circuits in FIG. 1 and FIG. 3 is described because both are entirely equivalent from the technical point of view, the only difference being the phase of signals transmitted through the separate circuits.

In FIG. 1, 1 is a DC motor 2 is a magnetic tape, and 3 is a holding means provided coaxially with the rotating axis of the DC motor. On the said holding means 3, magnetic heads 4a and 4b are provided, at spaces of 180°, symmetrically with the rotating axis. On the inner portion of the holding means 3, permanent magnets 5a and 5b are mounted and they serve, in connection with detectors 6a and 6b, for detecting servo signals for the said motor. 7 is a flywheel which is provided coaxially with the said motor, so as to accomplish smooth revolution.

Now, in order to obtain a position control signal in this embodiment, a disc 8 is installed under the said flywheel 7. On the surface of said disc 8 a geometrical pattern similar to a spur-wheel is carved relating to each gap between the commutators of the DC motor. Facing to the said disc 8, a detector 9 is provided so as to take up the control signal for gating source current and, according to the revolution of the said disc 8, variation of capacitance as shown in FIG. 3C appears between the said disc 8 and the detector 9.

Figure 3A:
Figure 3B:
Figure 3C:
Figure 3D:
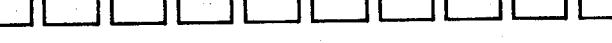
Figure 3E:

The output of the detector 9 is fed to a pulse amplifier 10 and, then after amplification to a multivibrator 11 which serves for conforming the phase of the sparking shown in FIG. 3A with the phase of a gate pulse signal which is utilized for gating source current for the short spark period. (FIG. 3B shows the variation of the current for this period.) That is, the width of the rectangular wave obtained from the said multivibrator may be varied by adjusting a variable resistor included in the multivibrator 11. The rectangular wave signal from the said multivibrator 11 is differentiated and a very sharp pulse generated at the back edge of the said rectangular wave is utilized as a driving signal of a multivibrator 12. In this case, it is required to adjust the variable resistor included in the said multivibrator 12 so that the width of the said rectangular wave may be made wider than the sparking period shown in FIG. 3A. The output from the said multivibrator 12 is fed to a gate pulse generator 13 to thereby obtain such a gate pulse signal as shown in FIG. 3D. To the gate circuit 15, the motor current which has been controlled by the said servo error signal, is supplied as an input at the terminal 14, and the current is gated by the said gate pulse from the gate pulse generator 13, and the output as shown in FIG. 3E is supplied to the DC motor 1 through a current amplifier 16.

As a result, undesired sparkings that occur between brushes and commutator segments in a direct current motor can be completely eliminated.

While we presently explain about the DC motor which is provided in video tape recorder especially, as one preferred embodiment, it is easily understood that it may be embodied in the communication apparatus comprising a high gain amplifier in which such DC motor is utilized as a power source.

Having thus described my invention in detail and the particularity required by the patent law, what is desired to have covered by letters patent is as follows.

I claim:

1. In a communication device having a high gain amplifier and a DC motor, an apparatus for eliminating commutator spark noise, said DC motor having a cylindrical commutator with a plurality of spaced commutator segments and at least two brushes spaced substantially 180° apart arranged to contact the commutator segments, said apparatus comprising:

1. at least one means comprising a disc coaxial with said commutator having circumferential indentures corresponding to the separation between commutator sections and probes for sensing the indentures for creating a commutator position indicating signal corresponding to the movement of the edge of a brush over the edge of a commutator segment,
2. at least one circuit means for amplifying and converting the position indicating signal into a gate pulse signal and for adjusting the width of the pulse signal and conforming the phase thereof to the passage of the edge of the brush over the edge of a commutator segment,
3. a gate circuit responsive to the output of said circuit means for gating the current to said DC motor.

2. In a device according to claim 1, said disc being mounted on a flywheel and a probe for sensing the variation in capacitance between the disc and the probe.

3. In a device according to claim 2, a circuit means comprising a pulse amplifier for increasing the output signal from the probe, at least one multivibrator for conforming the signal to the phase of the passage of the edge of the brush over the edges of the commutator segments, a gate pulse generator to create a gate pulse signal from the multivibrator output.

* * * * *